US008581558B2

(12) United States Patent
Sumimoto et al.

(10) Patent No.: US 8,581,558 B2
(45) Date of Patent: Nov. 12, 2013

(54) CONTROL DEVICE FOR VEHICLE AC GENERATOR

(75) Inventors: Katsuyuki Sumimoto, Chiyoda-ku (JP); Noriyuki Wada, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 352 days.

(21) Appl. No.: 12/970,275

(22) Filed: Dec. 16, 2010

(65) Prior Publication Data

US 2012/0007569 A1   Jan. 12, 2012

(30) Foreign Application Priority Data

Jul. 7, 2010 (JP) ................................. 2010-154751

(51) Int. Cl.
*H02P 11/00* (2006.01)
*H02P 9/00* (2006.01)

(52) U.S. Cl.
USPC ............................................. 322/24; 322/28

(58) Field of Classification Search
USPC .......... 322/24, 38, 55, 59, 89; 290/40 F, 40 B
See application file for complete search history.

(56) References Cited

U.S. PATENT DOCUMENTS

| | | | |
|---|---|---|---|
| 6,275,398 B1* | 8/2001 | Sumimoto et al. | 363/89 |
| 6,714,426 B1* | 3/2004 | Guo et al. | 363/25 |
| 7,015,594 B2* | 3/2006 | Asada | 290/40 R |
| 7,034,508 B1* | 4/2006 | Sasaki et al. | 322/28 |
| 7,075,272 B2* | 7/2006 | Sasaki et al. | 322/28 |
| 7,102,332 B1* | 9/2006 | Sasaki et al. | 322/28 |
| 8,053,915 B2* | 11/2011 | Umeda et al. | 290/7 |
| 2009/0033295 A1* | 2/2009 | Kouwa | 322/70 |
| 2011/0074333 A1* | 3/2011 | Suzuki | 318/724 |

FOREIGN PATENT DOCUMENTS

| | | |
|---|---|---|
| JP | 03-045200 A | 2/1991 |
| JP | 2006-050695 A | 2/2006 |
| JP | 2008-092785 A | 4/2008 |

* cited by examiner

*Primary Examiner* — Julio Gonzalez Ramirez
(74) *Attorney, Agent, or Firm* — Sughrue Mion, PLLC

(57) ABSTRACT

A control device for a vehicle AC generator, in which a part can be shared even when electrical configuration positions of field coils of rotors of generators are different, is obtained. Switching elements connected in series to the field coil in order to control a field current; and a control signal processing unit, in which information as to whether the field coil is connected to the high potential side or connected to the low potential side is inputted, one of the high potential side terminal and the low potential side terminal is selected on the basis of the inputted information, a control signal is outputted, and ON/OFF control of the switching element is performed to control the field current of the field coil, are provided.

17 Claims, 13 Drawing Sheets

| SPECIFICATIONS | SWITCHING ELEMENT | REFLUX ELEMENT |
|---|---|---|
| HIGH SIDE | Tr1 | Tr2 |
| LOW SIDE | Tr2 | Tr1 |

| CONFIGURATION | | SPECIFICATIONS | | LOGIC OF TERMINAL FHG AND FLG | |
|---|---|---|---|---|---|
| ELEMENT | CONTROL | | | TERMINAL FHG | TERMINAL FLG |
| MOS-MOS (Fig. 1 and Fig. 2) | SYNCHRONOUS RECTIFICATION IS USED | HIGH SIDE | | DUTY | $\overline{\text{DUTY}}$ |
| | | LOW SIDE | | $\overline{\text{DUTY}}$ | DUTY |
| | SYNCHRONOUS RECTIFICATION IS NOT USED | HIGH SIDE | | DUTY | OFF |
| | | LOW SIDE | | OFF | DUTY |
| MOS-Di (Fig. 11 and Fig. 12) | ONLY SYNCHRONOUS RECTIFICATION IS NOT USED | HIGH SIDE | | DUTY | NOT CONNECTED (Open) |
| | | LOW SIDE | | NOT CONNECTED (Open) | DUTY |

Fig. 6 ical configuration positions of the field coils of the rotors of the generators are different.

CONTROL DEVICE FOR VEHICLE AC GENERATOR

BACKGROUND OF THE INVENTION

1. Field of the Invention

The present invention relates to a control device for a vehicle AC (alternating current) generator and, more particularly, relates to a control device in which at least a part can be shared even when electrical configuration positions of field coils of AC generators are different.

2. Description of the Related Art

FIG. 13 is a configuration diagram showing a known vehicle AC generator system. In the drawing, when an internal combustion engine (not shown in the drawing) is started up, a rotor (having a field coil 102) of an AC generator (hereinafter, referred to as a "generator") is driven via a belt (not shown in the drawing). The field coil 102 is connected to terminals e and f via a slip ring and a brush (not shown in the drawing). With the driving of the rotor, an AC output voltage generated by a three phase armature coil 101 (on the stator side) is rectified by a three phase full wave rectifier 103. A DC (direct current) voltage (DC output voltage) rectified by the rectifier 103 charges a battery 120 connected to the rectifier 103 and supplies a power of 14V to an electric load 130. Incidentally, the armature coil 101, the field coil 102, and the rectifier 103 constitute a generator 100.

Reference numeral 105 denotes a switching element, for example, a power semiconductor switching element which is configured by a MOSFET (metal oxide semiconductor field effect transistor). The switching element 105 is connected in series to the field coil 102. A DC voltage of the rectifier 103 or the battery 120 is applied to a series body of the switching element 105 and the field coil 102 and ON/OFF control of the switching element 105 is performed; accordingly, a field current of the field coil 102 is controlled. 104 denotes a reflux diode; and when the switching element 105 is turned off, the field current due to residual energy in the field coil 102 refluxes through the reflux diode 104.

A control unit 110 performs ON/OFF control of the switching element 105 connected in series to the field coil 102, controls the field current flowing through the field coil 102, and controls an output voltage generated by the armature coil 101 to be a predetermined value. The reflux diode 104, the switching element 105, and the control unit 110 constitute a control device 108 for a vehicle AC generator. The vehicle AC generator system of FIG. 13 shows an electrical configuration position in which the field coil 102 is on the high potential side (high side) and the switching element 105 of the control device 108 is on the low potential side (low side) of a load (field coil 102). Incidentally, a vehicle AC generator system of a similar configuration is disclosed in, for example, Japanese Unexamined Patent Publication No. H3-45200.

FIG. 14 is a configuration diagram showing other known vehicle AC generator system. Incidentally, the same reference numerals as those shown in the specification and accompanying drawings represent identical or equivalent portions and their description will not be repeated. In FIG. 14, a description will be made on portions that are different from FIG. 13. A field coil 102 is connected to the low potential side (low side), one end is connected to a terminal f via a slip ring and a brush (not shown in the drawing), and the other end is grounded. A switching element 106 of a control device 108 is connected to the high potential side (high side) of a load (field coil 102), one end is connected to a rectifier 103 or a battery 120, and the other end is grounded via a (reverse direction) reflux diode 104.

As is apparent from FIG. 13 and FIG. 14, there are two types of the electrical configuration positions of the field coils of the rotors of the generators; and the known control devices 108 for the vehicle AC generators are different devices from each other to correspond to the generators 100 shown in FIG. 13 and FIG. 14. That is, there are two types: as shown in FIG. 13, a low side type where the switching element 105 in which ON/OFF control is to be performed is arranged on the low potential side (low side) of the load (field coil 102); and, as shown in FIG. 14, a high side type where the switching element 106 in which ON/OFF control is to be performed is arranged on the high potential side (high side) of the load (field coil 102). Characteristics of the respective types are as follows. In the low side type, a drive circuit configuration of the switching element 105 is simple and can be reduced in cost and size. In the high side type, a voltage is not applied to the field coil 102 during stopping; therefore, the influence of electrolytic corrosion can be reduced and high reliability can be obtained.

Therefore, although the roles of the control devices for the vehicle AC generators are the same, there are two types of the electrical configuration positions of the field coils of the rotors of the generators; and therefore, there is a problem in that development, design, evaluation, production, and administration for two types of the control devices (chips) have to be made. More particularly, the development and the evaluation demand an investment of tens of millions of yens; and thus, preparation for two types of the control devices of the vehicle AC generators places a considerably large burden on manufacturers of the vehicle AC generator system.

SUMMARY OF THE INVENTION

The present invention has been made to solve the problem as described above, and an object of the present invention is to provide a control device in which at least a part can be shared even when electrical configuration positions of field coils of rotors of generators are different.

According to the present invention, there is provided a control device for a vehicle AC generator, in which a DC voltage obtained by rectifying an AC output voltage of an armature coil in the AC generator that has the armature coil and a field coil with a rectifier is applied to the field coil to obtain a field current, and the field current is controlled. The control device for the vehicle AC generator includes: a switching element connected in series to the field coil in order to control the field current; and a control signal processing unit, in which information as to whether the field coil is connected to the high potential side or connected to the low potential side is inputted, one of a high potential side terminal and a low potential side terminal is selected on the basis of the inputted information, a control signal is outputted, and ON/OFF control of the switching element is performed to control the field current of the field coil. The control signal processing unit selects the low potential side terminal and performs ON/OFF control of the switching element to control the field current of the field coil when the information in which the field coil is connected to the high potential side is inputted, and the control signal processing unit selects the high potential side terminal and performs ON/OFF control of the switching element to control the field current of the field coil when the information in which the field coil is connected to the low potential side is inputted.

According to the control device for the vehicle AC generator of the present invention, there can be provided a control device in which at least a part can be shared even when electrical configuration positions of field coils of rotors of generators are different; and therefore, the costs of development, design, evaluation, production, and administration are reduced and burdens on manufacturers can be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a view showing the logic of terminals FHG and FLG in each of the high side and low side specifications;

DETAILED DESCRIPTION OF THE INVENTION

Embodiment 1

Figure 1:
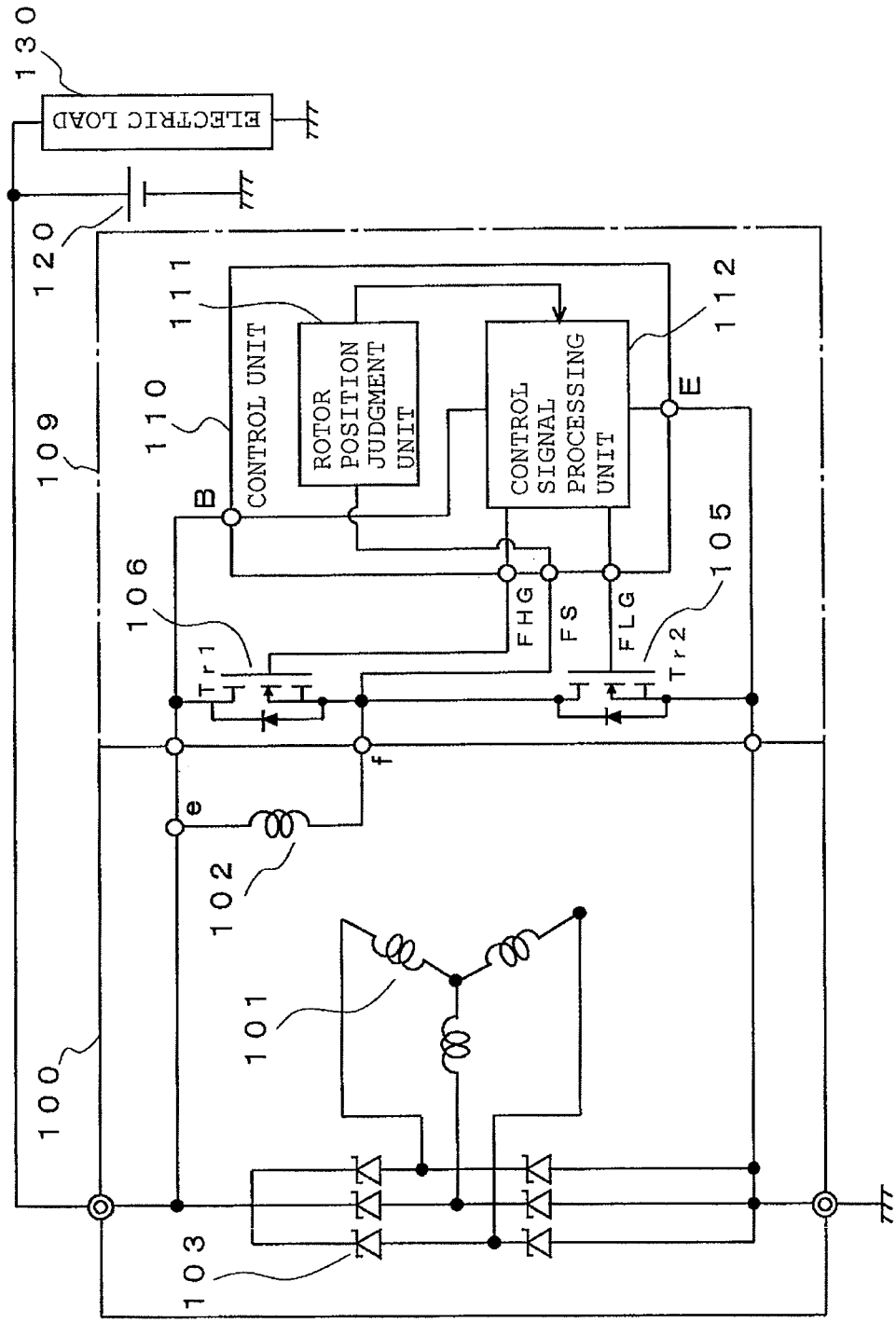
FIG. 1 is a configuration diagram showing a in Embodiment 1 of the present invention.
Figure 13:
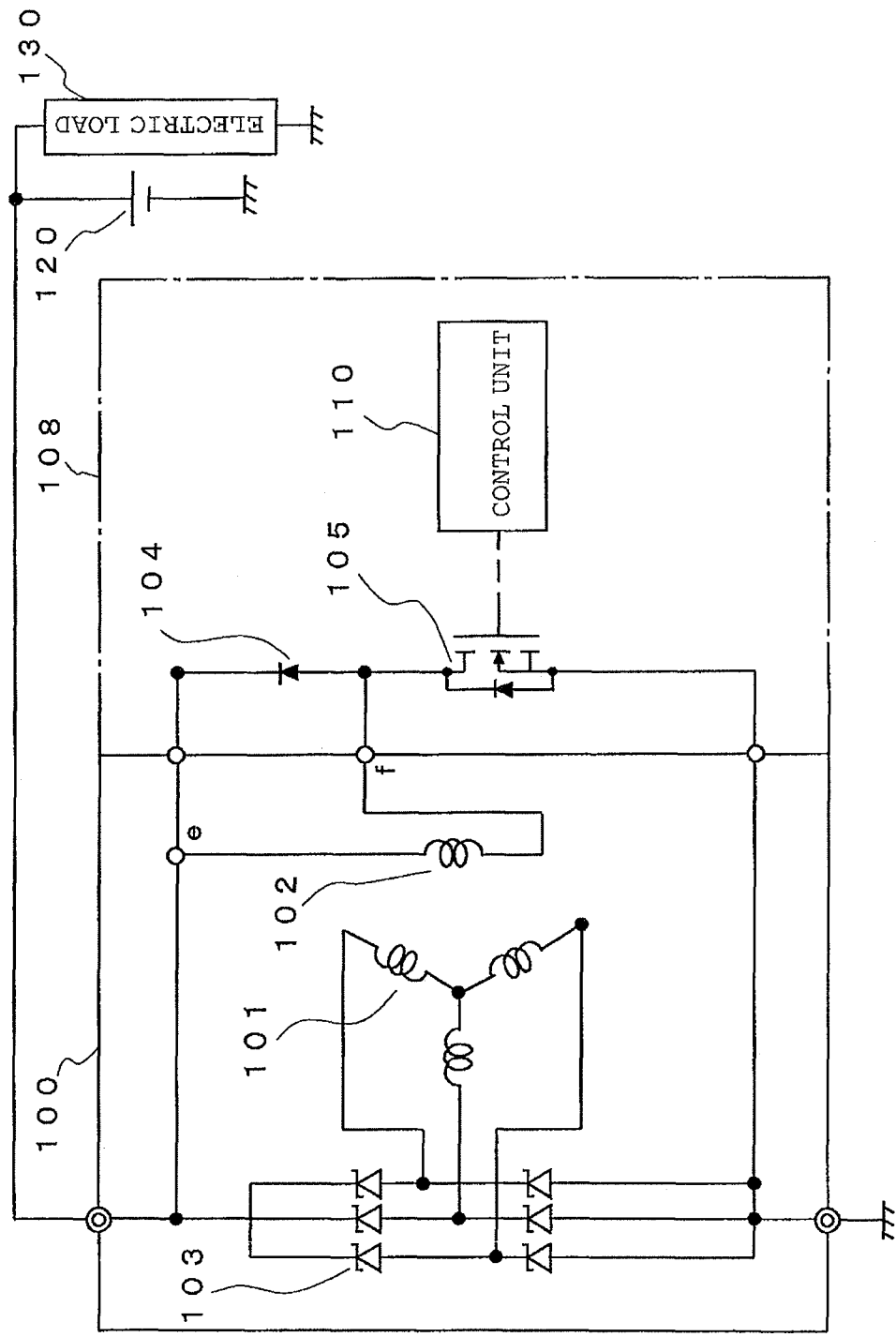
FIG. 13 is a configuration diagram showing a known vehicle AC generator system.

FIG. 1 is a configuration diagram showing a vehicle AC generator system in Embodiment 1 of the present invention. A generator 100, a battery 120, and an electric load 130 are the same configuration as FIG. 13. A control device 109 is a different configuration from the control device 108 of FIG. 13. In FIG. 1, an electrical configuration position of a field coil 102 of a rotor of the generator 100 is on the high potential side (high side); and a switching element 105 of the control device 109 is on the low potential side (low side) of a load (field coil 102). A connection destination of the field coil 102 is on the power supply side; the low potential side switching element (Tr2) 105 takes the role of a so-called switching element which determines a duty factor (duty) to the field coil 102; and a high potential side switching element (Tr1) 106 takes the role of a reflux element in a de-energized state. A series body, in which the high potential side switching element 106 is connected in series to the low potential side switching element 105, is connected between both ends of a rectifier 103 and is provided to control a field current. A node (terminal f) between the high potential side switching element 106 and the low potential side switching element 105 is connected to the field coil 102.

Figure 2:
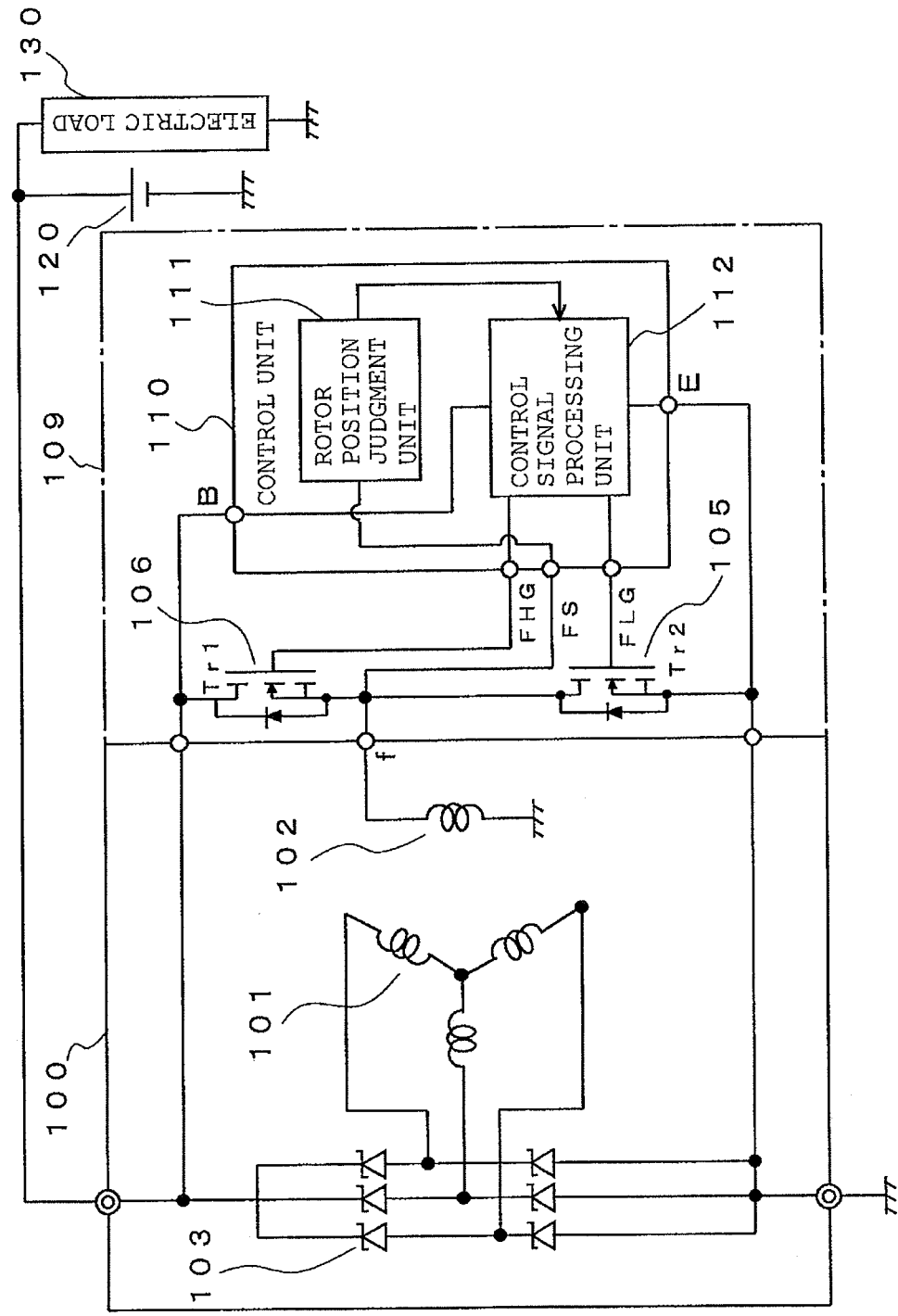
FIG. 2 is a configuration diagram showing other vehicle AC generator system in Embodiment 1.
Figure 14:
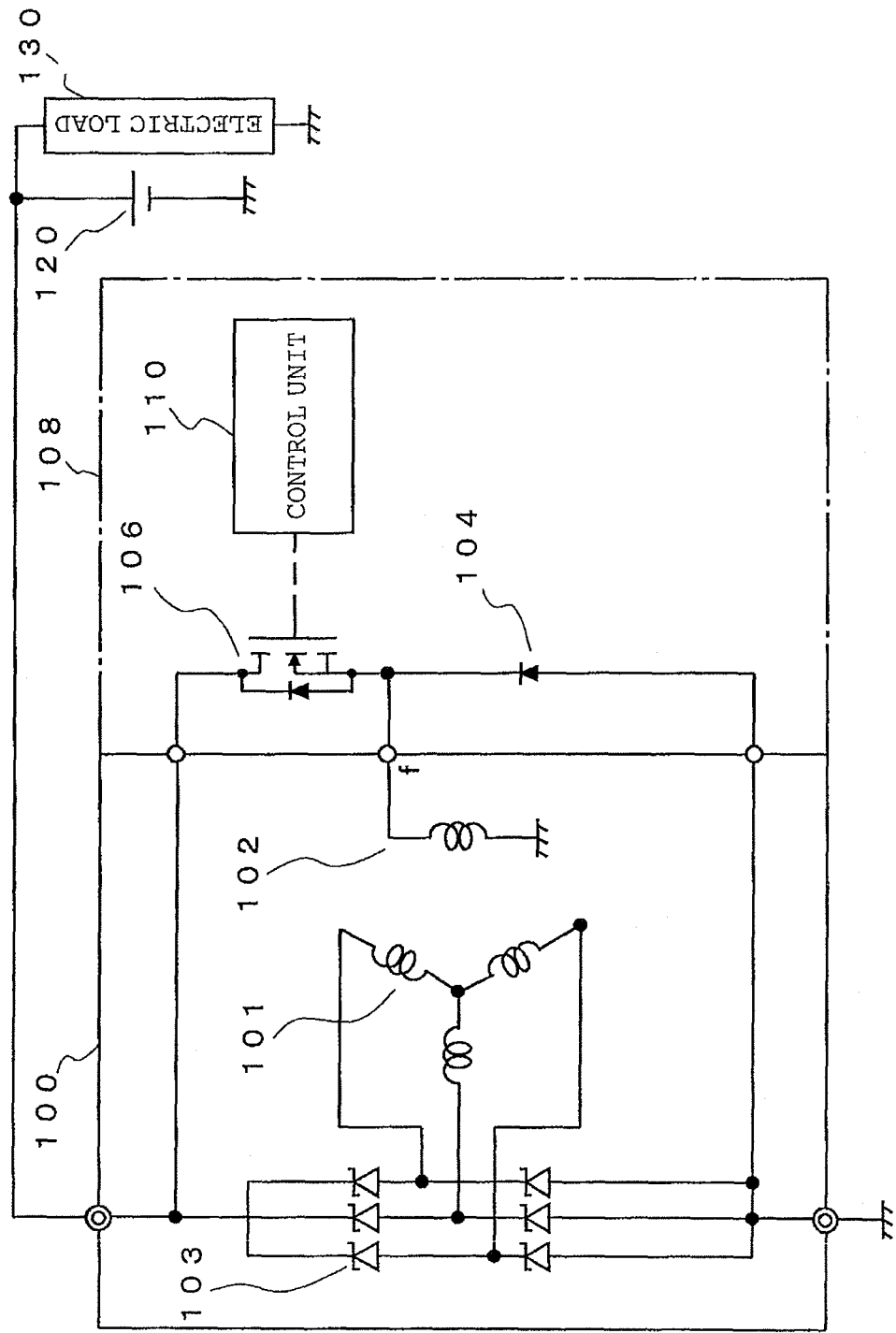
FIG. 14 is a configuration diagram showing other known vehicle AC generator system.

On the other hand, FIG. 2 is a configuration diagram showing other vehicle AC generator system in Embodiment 1. A generator 100, a battery 120, and an electric load 130 are the same configuration as FIG. 14. A control device 109 is a different configuration from the control device 108 in FIG. 14. In FIG. 2, an electrical configuration position of a field coil 102 of a rotor of the generator 100 is on the low potential side (low side); and a switching element 106 of the control device 109 is on the high potential side (high side) of a load (field coil 102). A connection destination of the field coil 102 is on the ground side; the high potential side switching element (Tr1) 106 takes the role of a so-called switching element which determines a duty factor (duty) to the field coil 102; and a low potential side switching element (Tr2) 105 takes the role of a reflux element in a de-energized state. A series body, in which the high potential side switching element 106 is connected in series to the low potential side switching element 105, is connected between both ends of a rectifier 103 and is provided to control a field current. A node (terminal f) between the high potential side switching element 106 and the low potential side switching element 105 is connected to the field coil 102.

Subsequently, a description will be made on the shared control device 109 available for FIG. 1 and FIG. 2 with respect to high side/low side specifications depending on the electrical configuration positions of the field coils 102. The control device 109 is the same configuration for FIG. 1 and FIG. 2. In FIG. 1 and FIG. 2, the terminal f is connected to one terminal of the field coil 102, and is a terminal of the node between the high potential side switching element 106 and the low potential side switching element 105.

Each control unit 110 has a power supply terminal B to be connected to a power supply, a ground terminal E to be grounded, a high potential side terminal FHG (field high gate) to be connected to the high potential side switching element 106, a low potential side terminal FLG (field low gate) to be connected to the low potential side switching element 105, and a terminal FS to be connected to one terminal of the field coil 102. The control unit 110 includes a rotor position judgment unit 111 which determines either the low side specifications (FIG. 1) or the high side specifications (FIG. 2) from a voltage at the terminal f (terminal FS); and a control signal processing unit 112 which selects one of the (high potential side terminal FHG) high potential side switching element 106 and the (low potential side terminal FLG) low potential side switching element 105 from a result (information) obtained by being determined by the rotor position judgment unit 111 and specifies the duty factor. Incidentally, as for an existing algorithm or the like which determines the duty factor to each of the switching elements 105 and 106, an existing one is used; and in Embodiment 1, a description will be made focusing attention on how the control signal processing unit 112 selects one of the high potential side terminal FHG and the low potential side terminal FLG and specifies one duty factor of the selected switching element 105 or 106.

Figures 3, 4:
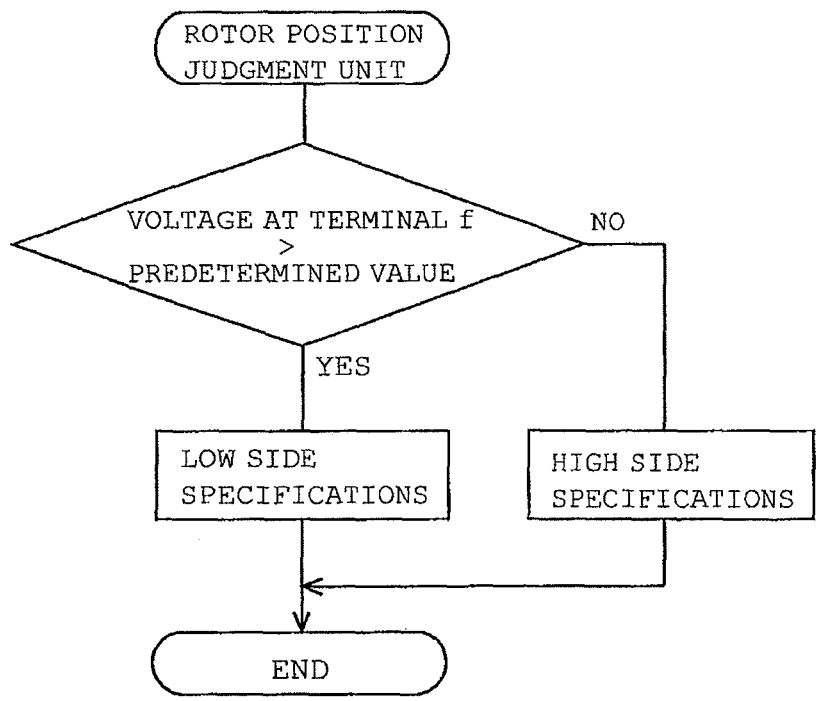
FIG. 3 is a flow chart showing operation of a rotor position judgment unit for use in Embodiment 1.
FIG. 4 is a view showing the role of elements in each of high side and low side specifications.

First, operation of the rotor position judgment unit 111 will be described. FIG. 3 shows a flow chart of the operation of the rotor position judgment unit 111. In FIG. 3, the voltage at the terminal f (terminal FS) is measured right after power on or the like in a non operating state of the high potential side switching element 106 and the low potential side switching element 105. When the voltage at the terminal f is larger than a predetermined value (set value) (for example, ½ of a battery voltage), a judgment is made that the field coil 102 is connected to a power supply line, and is determined as the low side specifications (configuration of FIG. 1). On the contrary, when the voltage at the terminal f is not satisfied with the predetermined value (set value), a judgment is made that the field coil 102 is connected to a ground line, and is determined as the high side specifications (configuration of FIG. 2). Incidentally, a period that both the high potential side switching element 106 and the low potential side switching element 105 are in the non operating state may be obtained by information from an external control device (for example, an ECU (engine control unit)).

In this case, respective specifications for the high side and the low side are as shown in FIG. 4. The high side specifications mean that the high potential side switching element (Tr1) 106 operates as the switching element and the low potential side switching element (Tr2) 105 operates as the reflux element (configuration of FIG. 2). On the contrary, the low side specifications mean that the high potential side switching element (Tr1) 106 operates as the reflux element and the low potential side switching element (Tr2) 105 operates as the switching element (configuration of FIG. 1). Information, either the high side specifications or the low side specifications, which is determined by the rotor position judgment unit 111 is outputted to the control signal processing unit 112.

Figure 5:
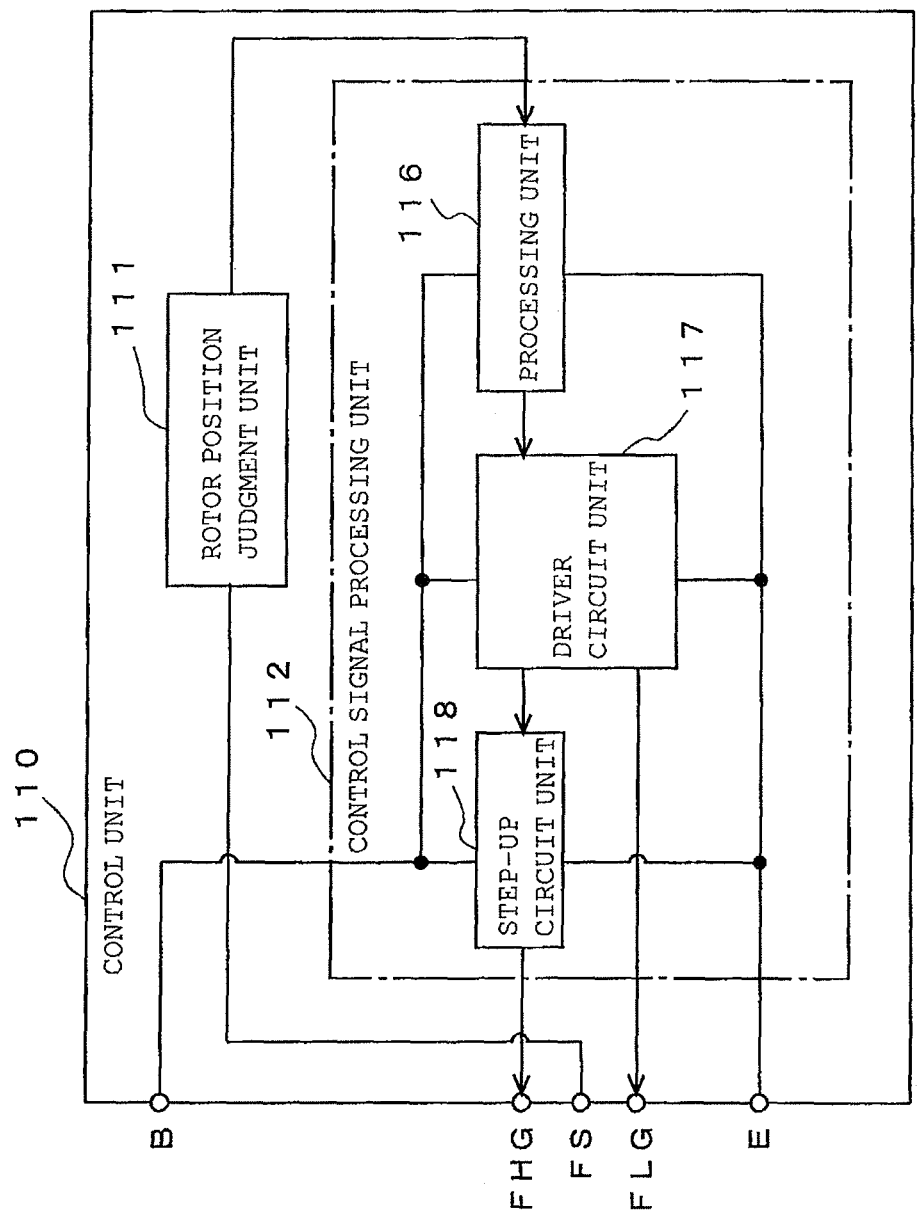
FIG. 5 is a configuration diagram showing a control unit 110 in Embodiment 1.

FIG. 5 is a configuration diagram showing the control unit 110 in Embodiment 1. The control signal processing unit 112 of the control unit 110 is a configuration example in the case where the switching elements 105 and 106 are MOSFETs; and the control signal processing unit 112 is composed of a processing unit 116, a driver circuit unit 117, and a step-up circuit unit 118. The information as to whether the field coil 102 is connected to the high potential side or connected to the low potential side, is inputted to the processing unit 116; the duty factor is generated by the existing algorithm; and one of the high potential side terminal FHG and the low potential side terminal FLG is selected by the logic depending on respective configurations shown in FIG. 6 (to be described later) on the basis of the inputted information. Incidentally, (referring to FIG. 6), in the case where synchronous rectification is used, and when one is selected, the other specifies reverse logic thereof (excluding a dead time period).

The output of the processing unit 116 is inputted to the driver circuit unit 117. The driver circuit unit 117 is configured depending on characteristics of the switching elements 105 and 106, such as switching time and switching loss. The driver circuit unit 117 selects and outputs one of the high potential side terminal FHG (system) and the low potential side terminal FLG by the logic based on designation of the processing unit 116. In the case where the high potential side terminal FHG (system) is selected, output is made to the step-up circuit unit 118. In the case where the high potential side switching element 106 is an n-channel MOSFET, a gate (high potential side terminal FHG) output needs to be higher potential with respect to the terminal FS and the power supply terminal B in order to turn on the switching element 106. Therefore, as the step-up circuit unit 118, a circuit with a boost strap method and/or a charge pump method is generally used.

In FIG. 6, in the case where both the switching elements 105 and 106 are the MOSFETs, and when the synchronous rectification is not used, in the high side specifications (FIG. 2), the high potential side terminal FHG is selected and ON/OFF control of the high potential side switching element 106 is performed; and the low potential side terminal FLG is turned off. Furthermore, in the low side specifications (FIG. 1), the low potential side terminal FLG is selected and ON/OFF control of the low potential side switching element 105 is performed; and the high potential side terminal FLG is turned off.

Figure 11:
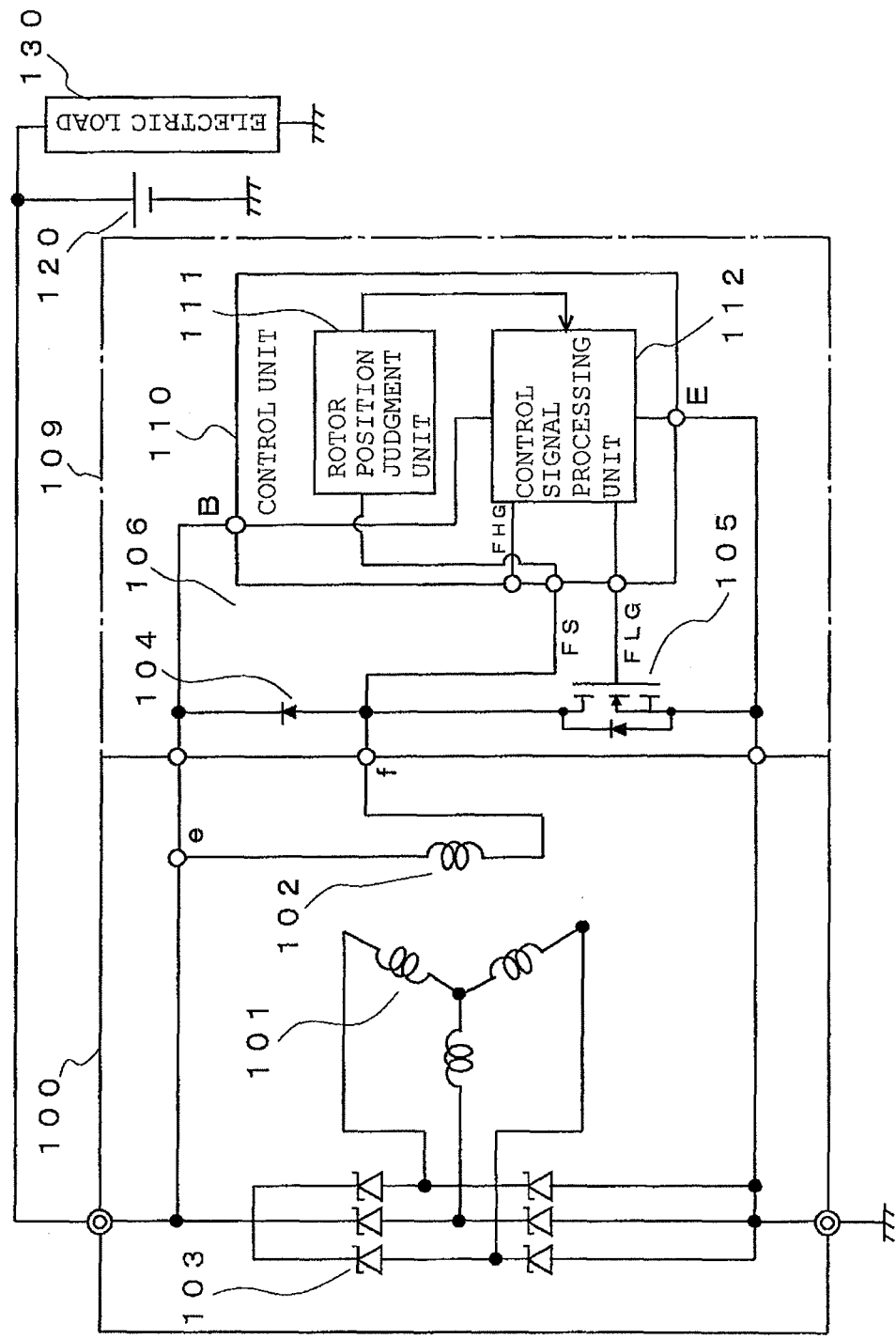
FIG. 11 is a configuration diagram showing a low side type vehicle AC generator system in Embodiment 6.
Figure 12:
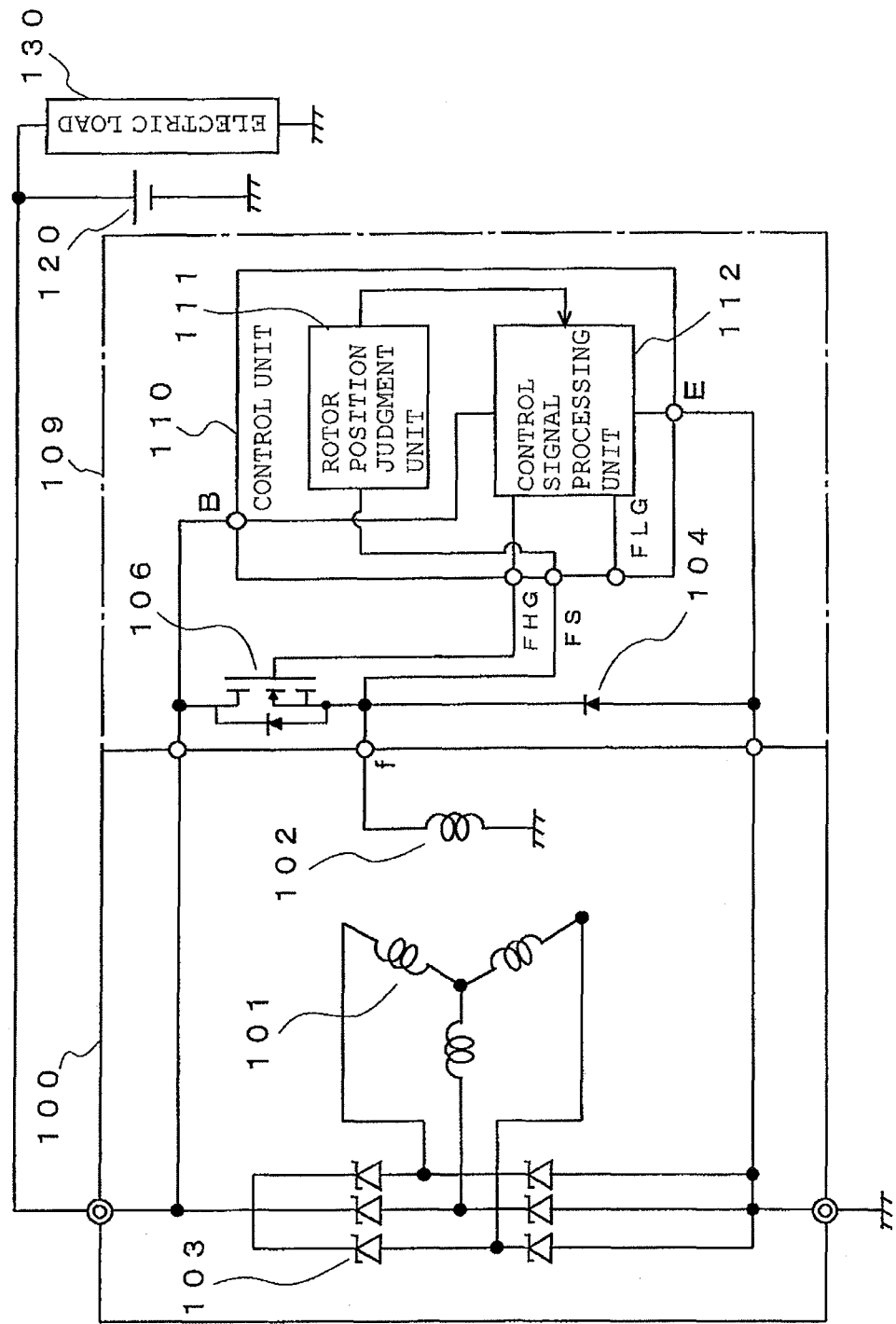
FIG. 12 is a configuration diagram showing a high side type vehicle AC generator system in Embodiment 6.

In order to reduce loss, when the synchronous rectification is used, in the high side specifications (FIG. 2), the high potential side terminal FHG is selected and ON/OFF control of the high potential side switching element 106 is performed; and OFF/ON control of the low potential side terminal FLG is performed by reverse logic control. Furthermore, in the low side specifications (FIG. 1), the low potential side terminal FLG is selected and ON/OFF control of the low potential side switching element 105 is performed; and OFF/ON control of the high potential side terminal FHG is performed by the reverse logic control. In this way, the control signal processing unit 112 selects one of the high potential side terminal FHG and the low potential side terminal FLG, outputs a control signal, and performs ON/OFF control of the switching element 105 or 106 to control the field current of the field coil 102. Incidentally, the configuration of "MOSFET-Di (MOSFET-Diode)" of FIG. 11 and FIG. 12 shown in FIG. 6 will be described later.

As described above, even when the electrical configuration positions of the field coils 102 of the rotors of the generators are different, the available shared control devices can be obtained in FIG. 1 and FIG. 2; and therefore, the costs of development, design, evaluation, production, and administration are reduced by half and burdens on manufacturers can be reduced. In Embodiment 1, the rotor position judgment unit 111 can determine whether the field coil 102 is connected to the high potential side or connected to the low potential side; therefore, unnecessary interface which is for performing the determination is not required, and the determination can be completed in the vehicle AC generator system and consequently a system configuration becomes simple.

Embodiment 2

Figure 7:
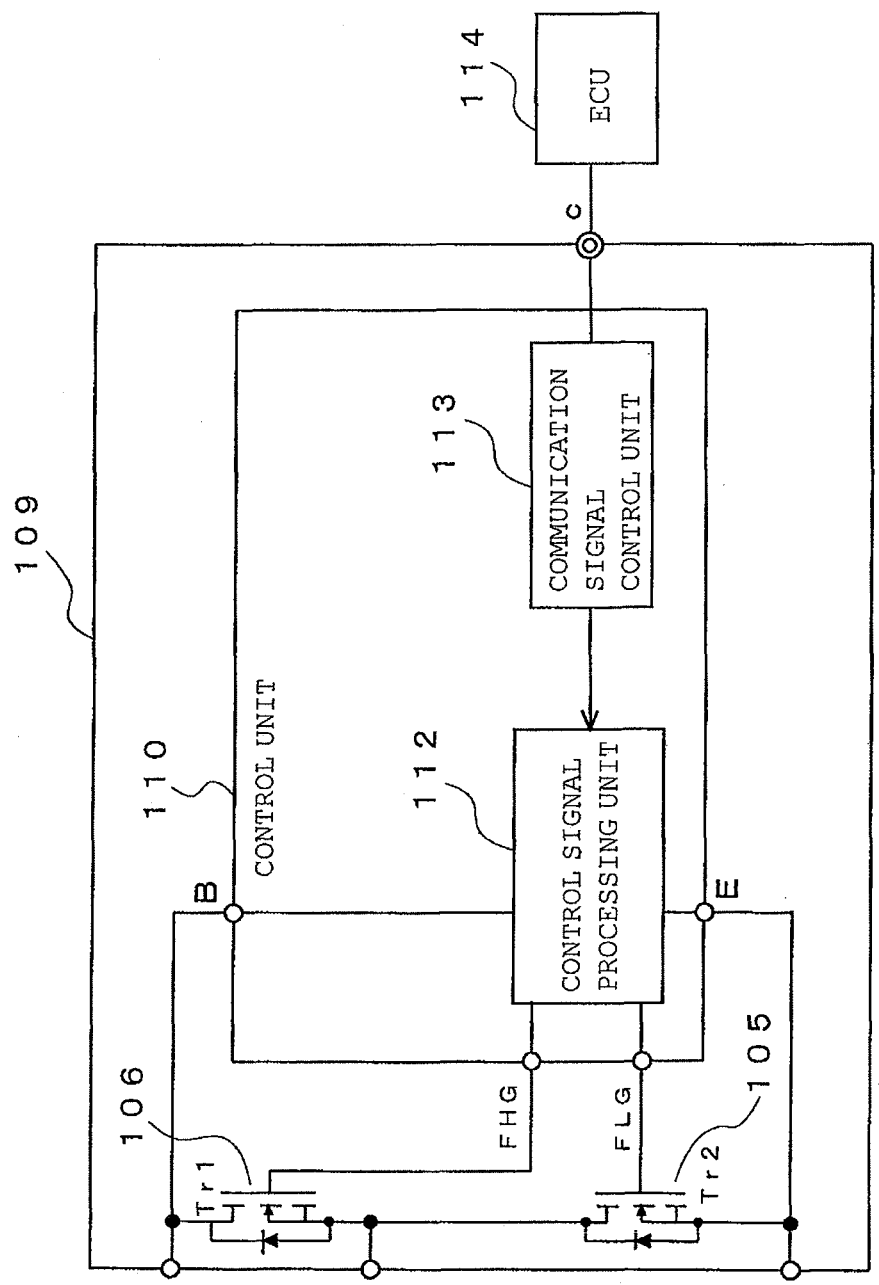
FIG. 7 is a configuration diagram showing a control device for a vehicle AC generator in Embodiment 2.

FIG. 7 is a configuration diagram showing a control device for a vehicle AC generator in Embodiment 2. A configuration in the case of switching by communication with an external control device (ECU) 114 is shown. In FIG. 7, the configuration of a generator 100 for a vehicle AC generator system is as shown in FIG. 1 or FIG. 2. A control device 109 which is the same for FIG. 1 and FIG. 2 is used. The external control device 114 and the control device 109 are connected via a communication terminal C. In this case, the external control device 114 may use an ECU mounted on a vehicle or may use a device which is for setting an initial state in such a way that a vehicle AC generator system which is connected only one time after completion in a production line.

The external control device 114 selects either specifications of high side specifications (generator 100 type of FIG. 2) or low side specifications (generator 100 type of FIG. 1), and information thereof is inputted to a communication signal control unit 113 via the communication terminal C. The communication signal control unit 113 determines whether the information transmitted from the external control device 114 is the high side specifications or the low side specifications depending on a communication protocol, and transmits determination information thereof to (a processing unit of) a control signal processing unit 112. Thereafter, operation of the control signal processing unit 112 is the same as Embodiment 1. As described above, the information as to whether a field coil 102 is connected to the high potential side or connected to the low potential side is inputted from the external control device 114 to the control signal processing unit 112; therefore, the information either the high side specifications or the low side specifications is obtained by a communication signal, the control signal processing unit 112 selects one of a high potential side terminal FHG and a low potential side terminal FLG, and can adopt the role of a high potential side switching element 106 and a low potential side switching element 105.

Embodiment 3

Figure 8:
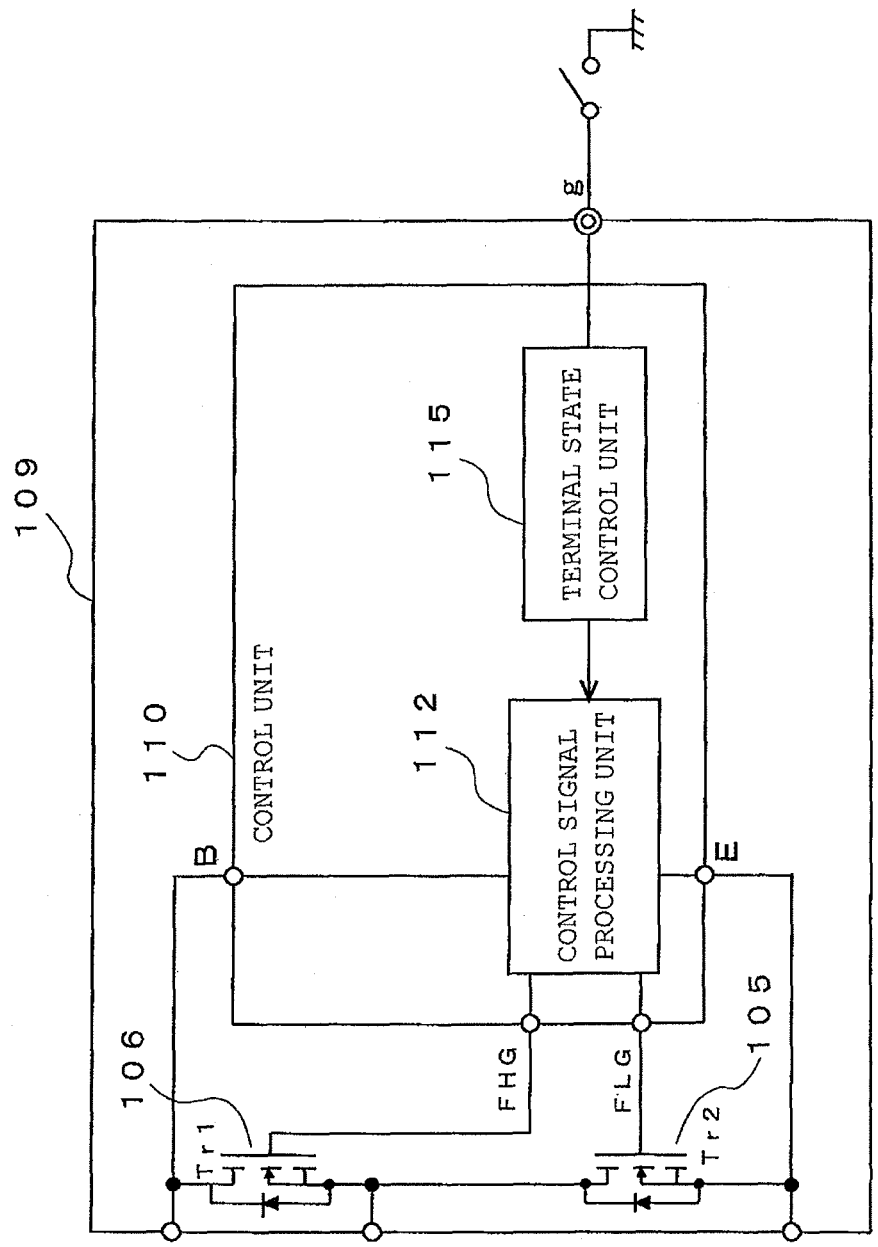
FIG. 8 is a configuration diagram showing a control device for a vehicle AC generator in Embodiment 3.
Figure 9:
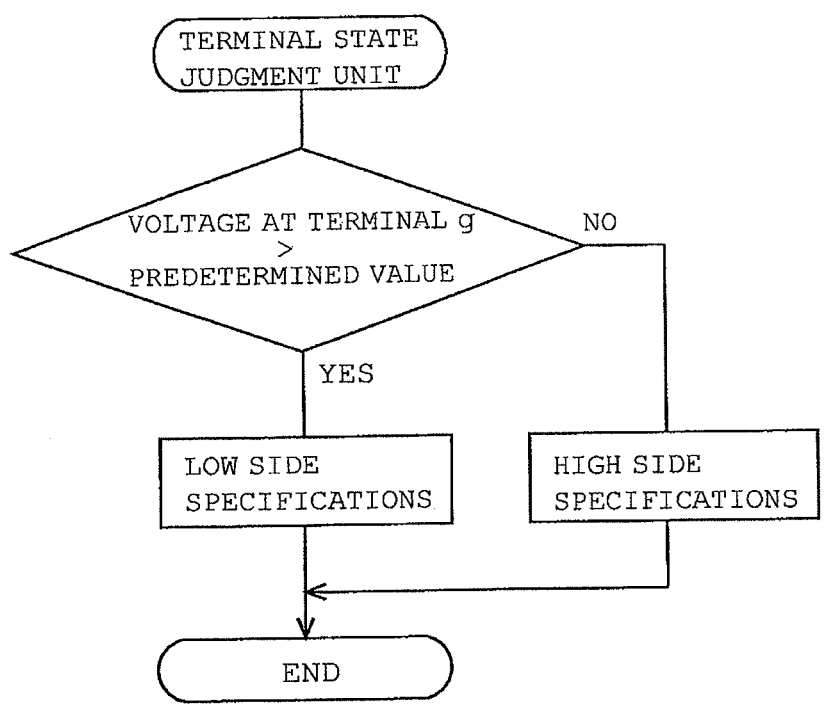
FIG. 9 is a flow chart showing operation of a terminal state judgment unit for use in Embodiment 3.

FIG. 8 is a configuration diagram showing a control device for a vehicle AC generator of Embodiment 3. Embodiment 3 is to obtain information as to whether an aforementioned field coil is connected to the high potential side or connected to the low potential side by potential at a potential switchable terminal. In FIG. 8, the configuration of a generator 100 for a vehicle AC generator system is as shown in FIG. 1 or FIG. 2. A control device 109 which is the same for FIG. 1 and FIG. 2 is used. In FIG. 8, the control device 109 includes a terminal g which is a potential switchable terminal and is for determining a terminal state. Potential at the terminal g is inputted to a terminal state judgment unit 115. Users can input or release predetermined potential (for example, ground potential) to or from the terminal g. FIG. 9 is a flow chart showing operation of the terminal state judgment unit 115. In the terminal state judgment unit 115, a determination is made whether or not a voltage at the terminal g is smaller than a predetermined value (set value); when the voltage is less than the predetermined value, it regards as low side specifications; and when the voltage is larger than the predetermined value, it regards as high side specifications. Incidentally, of course, the logic of switching these specifications may be reversed.

The information determined by the terminal state judgment unit 115 is outputted to a control signal processing unit 112. Thereafter, operation of the control signal processing unit 112 is the same as Embodiment 1. As described above, the information as to whether a field coil 102 is connected to the high potential side or connected to the low potential side is inputted from the terminal state judgment unit 115 to the control signal processing unit 112; therefore, the information either the high side specifications or the low side specifications is obtained, the control signal processing unit 112 selects one of a high potential side terminal FHG and a low potential side terminal FLG, and can adopt the role of a high potential side switching element 106 and a low potential side switching element 105.

Embodiment 4

Figure 10:
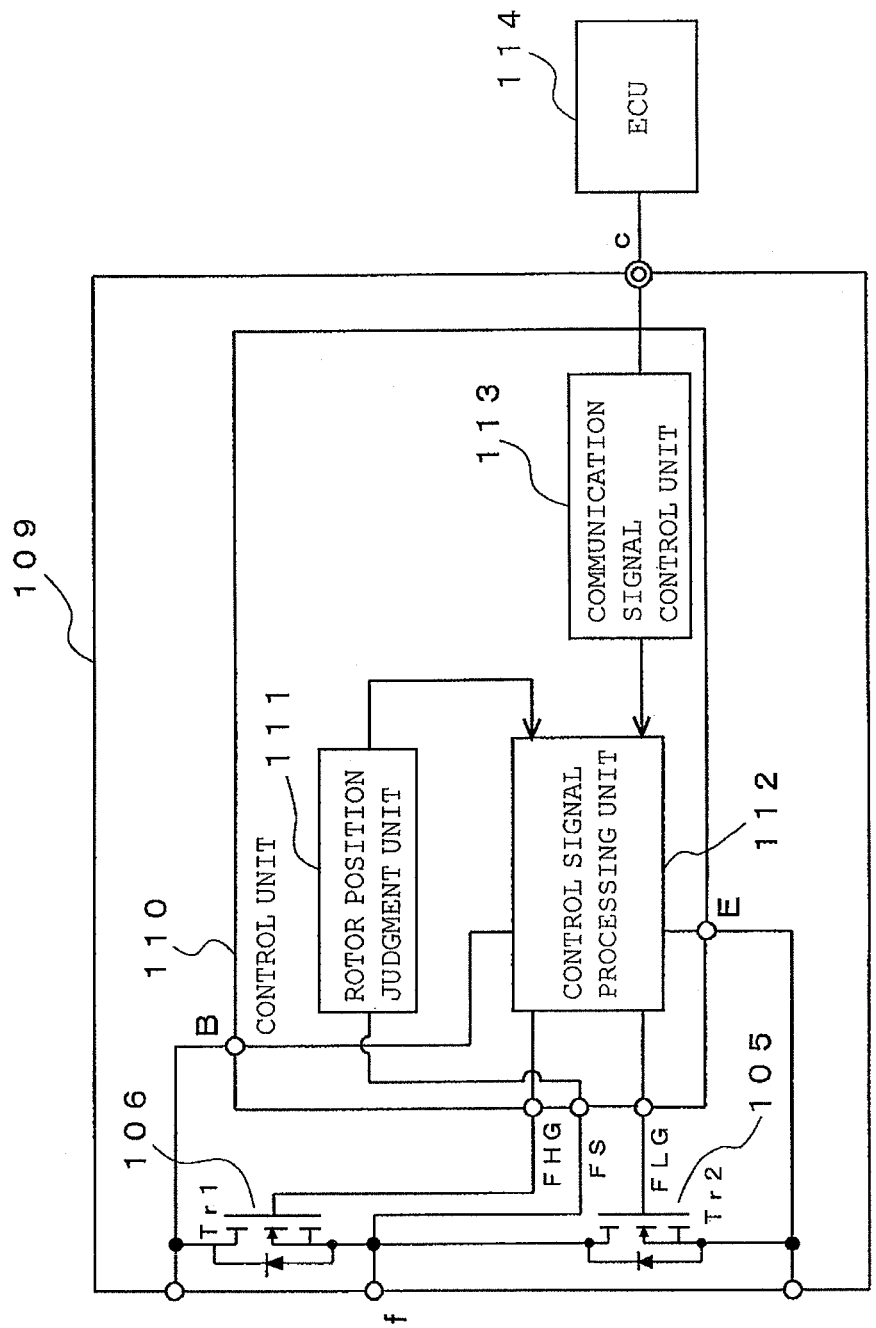
FIG. 10 is a configuration diagram showing a control device for a vehicle AC generator in Embodiment 4.

FIG. 10 is a configuration diagram showing a control device for a vehicle AC generator of Embodiment 4. A control signal processing unit 112 obtains information by communication with an external control device (ECU) 114, and obtains information of a voltage at a terminal f. In FIG. 10, the configuration of a generator 100 for a vehicle AC generator system is as shown in FIG. 1 or FIG. 2. A control device 109 which is the same for FIG. 1 and FIG. 2 is used. The external control device 114 may be an ECU mounted on a vehicle.

As described in Embodiment 1, a rotor position judgment unit 111 obtains information as to whether a field coil 102 is connected to the high potential side or connected to the low potential side from the voltage at the terminal f, and inputs the information to the control signal processing unit 112. The external control device 114 inputs an adoption period of the information from the rotor position judgment unit 111 to the control signal processing unit 112 via a communication terminal C and a communication signal control unit 113. That is, when the information is inputted from the external control device 114 to the control signal processing unit 112, the control signal processing unit 112 enables the information, which is inputted from the rotor position judgment unit 111 to the control signal processing unit 112, as to whether the field coil 102 is connected to the high potential side or connected to the low potential side. Then, on the basis of the enabled information, the control signal processing unit 112 selects one of a high potential side terminal FHG and a low potential side terminal FLG and selects one of a high potential side switching element 106 and a low potential side switching element 105 to control a field current of the field coil 102.

Similarly, as described in Embodiment 3, even in the case where the information as to whether the field coil 102 is connected to the high potential side or connected to the low potential side is inputted from the potential switchable terminal (terminal g in FIG. 8) to the control signal processing unit 112 via the terminal state judgment unit 115, when the information is inputted from the external control device 114 to the control signal processing unit 112 (adoption period), the control signal processing unit 112 enables the information, which is inputted from the potential switchable terminal (terminal g) to the control signal processing unit 112, as to whether the field coil 102 is connected to the high potential side or connected to the low potential side. Then, on the basis of the enabled information, the control signal processing unit 112 selects one of the high potential side terminal FHG and the low potential side terminal FLG and selects one of the high potential side switching element 106 and the low potential side switching element 105 to control the field current of the field coil 102.

As described above, when the information is inputted from the external control device 114 to the control signal processing unit 112, the control signal processing unit 112 enables the information, which is inputted to the control signal processing unit 112, as to whether the field coil is connected to the high potential side or connected to the low potential side; and therefore, properties thereof are strong against noise and reliability is improved. That is, even when the information is changed due to noise or the like other than modes of switching specifications, detection is not performed and therefore the reliability is improved.

Embodiment 5

Further, the configuration of Embodiment 5 may be such that, in FIG. 10, information from an external control device 114 (information as to whether a field coil is connected to the high potential side or connected to the low potential side) and information from a rotor position judgment unit 111 (information as to whether the field coil is connected to the high potential side or connected to the low potential side) are inputted to a control signal processing unit 112; and when the contents of two pieces of the information coincide, on the basis of the information, the control signal processing unit 112 selects one of a high potential side terminal FHG and a low potential side terminal FLG and selects one of a high potential side switching element and a low potential side switching element to control a field current of the field coil. In doing so, reliability is improved. When the contents of two pieces of the information do not coincide, such a process is regarded as a fail.

Similarly, in addition to the aforementioned combination, the configuration of Embodiment 5 may be such that either two pieces of information of information from the external control device 114 (information as to whether the field coil is connected to the high potential side or connected to the low potential side), or information from the rotor position judgment unit 111 (information as to whether the field coil is connected to the high potential side or connected to the low potential side), or information from a terminal g (information as to whether the field coil is connected to the high potential side or connected to the low potential side) are used; and when the contents of two pieces of the information coincide, on the basis of the information, the control signal processing unit 112 selects one of the high potential side terminal FHG and the low potential side terminal FLG and selects one of the high potential side switching element and the low potential side switching element to control the field current of the field coil. In doing so, reliability is improved. When the contents of two pieces of the information do not coincide, such a process is regarded as a fail.

Embodiment 6

FIG. 11 is a configuration diagram showing a vehicle AC generator system of a low side type in Embodiment 6. In the case of the low side type, a series body of a reflux diode 104 (power supply side) and a low potential side switching element 105 is connected between both ends of a rectifier 103; and one end of a field coil 102 is connected to a node between the reflux diode 104 and the switching element 105. A high potential side terminal FHG of a control unit 110 is not connected (open). Other configuration is the same as FIG. 1 of Embodiment 1.

FIG. 12 is a configuration diagram showing a vehicle AC generator system of a high side type in Embodiment 6. In the case of the high side type, a series body of a high potential side switching element 106 and a reflux diode 104 (ground side) is connected between both ends of a rectifier 103; and one end of a field coil 102 is connected to a node between the high potential side switching element 106 and the reflux diode 104. A low potential side terminal FLG of a control unit 110 is not connected (open). Other configuration is the same as FIG. 2 of Embodiment 1.

Operation of Embodiment 6 will be described about mainly different points from Embodiment 1. A voltage at a terminal f (terminal FS) is measured by a rotor position judgment unit 111 in the case where the reflux diode 104 and the switching element 105 or 106 are in a non operating state. A flow chart of operation of the rotor position judgment unit 111 is the same as FIG. 3. If a determination result of the rotor position judgment unit 111 is determined as high side specifications, information thereof is inputted to a control signal processing unit 112. When the information is inputted, the control signal processing unit 112 selects "MOS-Di (FIG. 11 and FIG. 12), only synchronous rectification is not used, high side, and high potential side terminal FHG" shown in FIG. 6 (FIG. 12); and performs ON/OFF control of the high potential side switching element 106 to control a field current of the field coil 102. At this time, the low potential side terminal FLG is not connected.

Alternatively, the determination result is determined as low side specifications, information thereof is inputted to the control signal processing unit 112. When the information is inputted, the control signal processing unit 112 selects "MOS-Di (FIG. 11 and FIG. 12), only synchronous rectification is not used, low side, and low potential side terminal FLG" shown in FIG. 6 (FIG. 11); and performs ON/OFF control of the low potential side switching element 105 to control the field current of the field coil 102. At this time, the high potential side terminal FHG is not connected.

When FIG. 11 (low side type) is compared with FIG. 12 (high side type), the control unit 110 in the control device 109 is shared. Therefore, the control unit 110 can be shared for the series body of the reflux diode 104 and the low potential side switching element 105 in FIG. 11 and the series body of the high potential side switching element 106 and the reflux diode 104 in FIG. 12; and therefore, the costs of development, design, evaluation, production, and administration are reduced and burdens on manufacturers can be reduced.

Next, the control unit 110 of FIG. 7 in Embodiment 2 can be used in place of the control unit 110 of FIG. 11 in Embodiment 6. At that time, similarly, the high potential side terminal FHG is not connected; but the terminal B and the terminal E are connected. The low potential side switching element 105 of FIG. 11 is connected to the low potential side terminal FLG of the control unit 110 of FIG. 7. A terminal f of FIG. 11 is not connected to the control unit 110 of FIG. 7.

Alternatively, the control unit 110 of FIG. 7 in Embodiment 2 can be used in place of the control unit 110 of FIG. 12 in Embodiment 6. At that time, similarly, the low potential side terminal FLG is not connected; but the terminal B and the terminal E are connected. The high potential side switching element 106 of FIG. 12 is connected to the high potential side terminal FHG of the control unit 110 of FIG. 7. A terminal f of FIG. 12 is not connected to the control unit 110 of FIG. 7.

As described above, the information as to whether the field coil 102 is connected to the high potential side or connected to the low potential side is inputted from the external control device 114 to the control signal processing unit 112; therefore, the information either the high side specifications or the low side specifications is obtained by a communication signal, and the control signal processing unit 112 can select one of the high potential side terminal FHG and the low potential side terminal FLG.

Next, the control unit 110 of FIG. 8 in Embodiment 3 can be used in place of the control unit 110 of FIG. 11 in Embodiment 6. A connection relationship among the respective terminals B, FHG, FLG, and E are the same as those in FIG. 7. The control unit 110 of FIG. 8 in Embodiment 3 can be used in place of the control unit 110 of FIG. 12 in Embodiment 6. A connection relationship among the respective terminals B, FHG, FLG, and E are the same as those in FIG. 7.

As described above, the information as to whether the field coil 102 is connected to the high potential side or connected to the low potential side is inputted from the external control device 115 to the control signal processing unit 112; therefore, the information either the high side specifications or the low side specifications is obtained, and the control signal processing unit 112 can select one of the high potential side terminal FHG and the low potential side terminal FLG.

Further, the control unit 110 of FIG. 10 in Embodiment 4 can be used in place of the control unit 110 of FIG. 11 in Embodiment 6. At that time, similarly, the high potential side terminal FHG is not connected; but, the terminals B, FS, and E are connected. The low potential side switching element 105 of FIG. 11 is connected to the low potential side terminal FLG of FIG. 10.

The control unit 110 of FIG. 10 in Embodiment 4 can be used in place of the control unit 110 of FIG. 12 in Embodiment 6. At that time, similarly, the low potential side terminal FLG is not connected; but, the terminals B, FS, and E are connected. The high potential side switching element 106 of FIG. 12 is connected to the high potential side terminal FHG of FIG. 10.

In doing so, when information is inputted from the external control device 114 to the control signal processing unit 112, the control signal processing unit 112 enables the information, which is inputted from the rotor position judgment unit 111 to the control signal processing unit 112, as to whether the field coil 102 is connected to the high potential side or connected to the low potential side. Then, on the basis of the enabled information, the control signal processing unit 112 selects one of a high potential side terminal FHG and a low potential side terminal FLG.

Similarly, as described in Embodiment 3, even in the case where the information as to whether the field coil 102 is connected to the high potential side or connected to the low potential side is inputted from the potential switchable terminal (terminal g in FIG. 8) to the control signal processing unit 112 via the terminal state judgment unit 115, when the information is inputted from the external control device 114 to the control signal processing unit 112 (adoption period), the control signal processing unit 112 enables the information, which is inputted from the potential switchable terminal (terminal g) to the control signal processing unit 112, as to whether the field coil 102 is connected to the high potential side or connected to the low potential side. Then, on the basis of the enabled information, the control signal processing unit 112 selects one of the high potential side terminal FHG and the low potential side terminal FLG.

Further, in the case where the control unit 110 of FIG. 10 is used in place of the control unit 110 of Embodiment 6, information from the external control device 114 (information as to whether the field coil is connected to the high potential side or connected to the low potential side) and information from the rotor position judgment unit 111 (information as to whether the field coil is connected to the high potential side or connected to the low potential side) are inputted to the control signal processing unit 112; and when the contents of two pieces of the information coincide, on the basis of the information, the control signal processing unit 112 selects one of the high potential side terminal FHG and the low potential side terminal FLG.

Similarly, in addition to the aforementioned combination, either two pieces of information of information from the external control device 114 (information as to whether the field coil is connected to the high potential side or connected to the low potential side), or information from the rotor position judgment unit 111 (information as to whether the field coil is connected to the high potential side or connected to the low potential side), or information from the terminal g (information as to whether the field coil is connected to the high potential side or connected to the low potential side) are used; and when the contents of two pieces of the information coincide, on the basis of the information, the control signal processing unit 112 selects one of the high potential side terminal FHG and the low potential side terminal FLG. In doing so, reliability is improved. When the contents of two pieces of the information do not coincide, such a process is regarded as a fail.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A control device for a vehicle AC generator, in which a DC voltage obtained by rectifying an AC output voltage of an armature coil in said AC generator that has said armature coil and a field coil with a rectifier is applied to said field coil to obtain a field current, and the field current is controlled, said control device for the vehicle AC generator comprising:
   a switching element connected to said field coil in order to control the field current; and
   a control signal processing unit,
      in which information as to whether said field coil is connected to a high potential side or connected to a low potential side is inputted,
      one of a high potential side terminal and a low potential side terminal is selected on the basis of the inputted information,
      a control signal is outputted, and
      ON/OFF control of said switching element is performed to control the field current of said field coil,
   wherein said control signal processing unit selects the low potential side terminal and performs ON/OFF control of said switching element to control the field current of said field coil when the inputted information indicates that said field coil is connected to the high potential side, and
   wherein said control signal processing unit selects the high potential side terminal and performs ON/OFF control of said switching element to control the field current of said field coil when the inputted information indicates that said field coil is connected to the low potential side.

2. The control device for the vehicle AC generator according to claim 1,
   wherein the switching element comprises a high potential side switching element and a low potential side switching element,
   wherein, in order to control the field current, said high potential side switching element is connected in series to said low potential side switching element, and said field coil is connected at a node between said high potential side switching element and said low potential side switching element;
   wherein said control signal processing unit selects the low potential side terminal and performs ON/OFF control of said low potential side switching element to control the field current of said field coil when the inputted information indicates that said field coil is connected to the high potential side; and
   wherein said control signal processing unit selects the high potential side terminal and performs ON/OFF control of said high potential side switching element to control the field current of said field coil when the inputted information indicates that said field coil is connected to the low potential side.

3. The control device for the vehicle AC generator according to claim 1,
   wherein, in order to control the field current, said switching element is connected in series to a reflux diode, and said field coil is connected at a node between said reflux diode and said switching element;
   said control signal processing unit selects the low potential side terminal and performs ON/OFF control of said switching element to control the field current of said field coil when the information in which said field coil is connected to the high potential side is inputted; and
   said control signal processing unit selects the high potential side terminal and performs ON/OFF control of said switching element to control the field current of said field coil when the information in which said field coil is connected to the low potential side is inputted.

4. The control device for the vehicle AC generator according to claim 2,
   further comprising a rotor position judgment unit in which, in the case where said high potential side switching element and said low potential side switching element are in a non operating state, a determination is made that said field coil is connected to the high potential side when a voltage at the node connected to said field coil is larger than a set value, and a determination is made that said field coil is connected to the low potential side when the voltage at the node is smaller than the set value,
   said rotor position judgment unit outputting the information as to whether said field coil is connected to the high potential side or connected to the low potential side to said control signal processing unit.

5. The control device for the vehicle AC generator according to claim 3,
   further comprising a rotor position judgment unit in which, in the case where said reflux diode and said switching element are in a non operating state, a determination is made that said field coil is connected to the high potential side when a voltage at the node connected to said field coil is larger than a set value, and a determination is made that said field coil is connected to the low potential side when the voltage at the node is smaller than the set value, said rotor position judgment unit outputting the information as to whether said field coil is connected to the high potential side or connected to the low potential side to said control signal processing unit.

6. The control device for the vehicle AC generator according to claim 1,
wherein the information as to whether said field coil is connected to the high potential side or connected to the low potential side is inputted from an external control device to said control signal processing unit.

7. The control device for the vehicle AC generator according to claim 2,
wherein the information as to whether said field coil is connected to the high potential side or connected to the low potential side is inputted from an external control device to said control signal processing unit.

8. The control device for the vehicle AC generator according to claim 3,
wherein the information as to whether said field coil is connected to the high potential side or connected to the low potential side is inputted from an external control device to said control signal processing unit.

9. The control device for the vehicle AC generator according to claim 1,
wherein the information as to whether said field coil is connected to the high potential side or connected to the low potential side is inputted from a potential switchable terminal to said control signal processing unit.

10. The control device for the vehicle AC generator according to claim 2,
wherein the information as to whether said field coil is connected to the high potential side or connected to the low potential side is inputted from a potential switchable terminal to said control signal processing unit.

11. The control device for the vehicle AC generator according to claim 3,
wherein the information as to whether said field coil is connected to the high potential side or connected to the low potential side is inputted from a potential switchable terminal to said control signal processing unit.

12. The control device for the vehicle AC generator according to claim 4,
wherein, when the information is inputted from an external control device to said control signal processing unit, said control signal processing unit enables the information, which is inputted to said control signal processing unit, as to whether said field coil is connected to the high potential side or connected to the low potential side.

13. The control device for the vehicle AC generator according to claim 5,
wherein, when the information is inputted from an external control device to said control signal processing unit, said control signal processing unit enables the information, which is inputted to said control signal processing unit, as to whether said field coil is connected to the high potential side or connected to the low potential side.

14. The control device for the vehicle AC generator according to claim 9,
wherein, when the information is inputted from an external control device to said control signal processing unit, said control signal processing unit enables the information, which is inputted to said control signal processing unit, as to whether said field coil is connected to the high potential side or connected to the low potential side.

15. The control device for the vehicle AC generator according to claim 4,
wherein, when the information, which is inputted from said rotor position judgment unit to said control signal processing unit, as to whether said field coil is connected to the high potential side or connected to the low potential side and
the information, which is inputted from an external control device to said control signal processing unit, as to whether said field coil is connected to said high potential side or connected to said low potential side
coincide in their information contents,
said control signal processing unit selects one of the high potential side terminal and the low potential side terminal on the basis of the coincided information contents and controls the field current of said field coil.

16. The control device for the vehicle AC generator according to claim 9,
wherein, when the information, which is inputted from the potential switchable terminal to said control signal processing unit, as to whether said field coil is connected to the high potential side or connected to the low potential side and
the information, which is inputted from an external control device to said control signal processing unit, as to whether said field coil is connected to said high potential side or connected to said low potential side
coincide in their information contents,
said control signal processing unit selects one of the high potential side terminal and the low potential side terminal on the basis of the coincided information contents and controls the field current of said field coil.

17. The control device for the vehicle AC generator according to claim 4,
wherein, when the information, which is inputted from said rotor position judgment unit to said control signal processing unit, as to whether said field coil is connected to the high potential side or connected to the low potential side and
the information, which is inputted from a potential switchable terminal to said control signal processing unit, as to whether said field coil is connected to said high potential side or connected to said low potential side
coincide in their information contents,
said control signal processing unit selects one of the high potential side terminal and the low potential side terminal on the basis of the coincided information contents and controls the field current of said field coil.

* * * * *